Patented Dec. 9, 1930

1,784,379

UNITED STATES PATENT OFFICE

EDUARD MÜNCH, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PROCESS OF REDUCING ORGANIC KETO COMPOUNDS

No Drawing. Application filed May 19, 1927, Serial No. 192,796, and in Germany June 24, 1926.

I have found that vat dyestuffs and also other organic substances, which contain reducible carbonyl or quinone groups, like those contained in vat dyestuffs, can be very readily and smoothly reduced by treating them with mixtures of sulfurous acid and formic acid, in the presence of organic bases, but in the absence of any considerable amounts of water, diluents being added if desired.

The process according to this invention offers the advantage that the leuco-compounds of the vat dyestuffs, and the reduction products of the other organic substances, can be obtained directly in a dry, or nearly dry, state. It is therefore possible to subject the reduction products, in the reduction mixture itself, to further reactions in which the presence of water is injurious or undesirable. In particular, the products can be transformed directly into esters by treatment with acylating agents, such as chlorsulfonic acid or esters of same, phosphorous oxychlorid, acetic anhydride and the like. In this way, not only is the work simplified, but the products are also often obtained in a purer state and in higher yield than by other methods. In some cases the acylating agent may even be added already in the course of the reduction.

The reduction products may also be first isolated, for example by filtering or otherwise removing the products, which usually separate out, in crystalline form, during the reaction or on cooling or diluting the reaction mixture, or by distilling off the bases and the diluent employed, if such be added, preferably under diminished pressure. The resulting leuco-compounds may then be converted, for example, into the sulfuric esters, by treatment, according to the U. S. Patent No. 1,448,251, with a mixture of dimethylaniline, chlorbenzene and chlorsulfonic acid.

For the reduction, the sulfurous acid or formic acid, or both, the employment of which in the free state affords the advantage that no inorganic salts are brought into the reduction mixture, may also be applied partly in a combined condition, for example as dry sodium bisulphite with formic acid or ammonium or metal-formates.

Many organic bases may be employed in the reduction, such as pyridine and its homologues, aniline, dimethylaniline, piperidine, tri-hydroxy-ethyl-amine, or mixtures of the same, or even substances but slightly basic, such as amides, as for example formamide.

The following examples will further illustrate how the invention may be carried out in practice, but the invention is not restricted to these examples. The parts are by weight.

Example 1

13 parts of sulfurous acid are introduced into 150 parts of pyridine, followed, at ordinary temperature, by 30 parts of 5.5'.7.7'-tetrabromindigo and 3.5 parts of a 98 per cent solution of formic acid. The dyestuff is completely reduced in 20 minutes or thereabouts by warming the mixture to from 60° to 70° C., accompanied by good stirring and the passage of a non-oxidizing gas such as carbon dioxid or coal gas through the reaction mixture. On cooling the resulting golden yellow solution, the bulk of the leuco-compound separates out as yellow crystals. The pyridine can be almost completely expelled from the solution by distillation at about 40° C. under diminished pressure, the greenish-yellow leuco-compound being left behind in a dry state.

Example 2

10 parts of 5.5'.7.7'-tetrabromindigo are reduced, at from 30° to 40° C., in a mixture of 80 parts of pyridine, 8 parts of sulfurous acid and 3 parts of a 98 per cent formic acid solution. 20 parts of chlorsulfonic acid are then dropped slowly into the mixture at from −8° to −12° C., whereby the hitherto golden-yellow reduction mixture acquires a bluish color. The mixture is next warmed, the color again becoming yellow at about 45° C., and the temperature is maintained at 70° C. for about half an hour, after which the mass is poured into cold water, the mixture rendered alkaline with sodium carbonate or caustic soda solution, and the pyridine expelled by distillation with steam. The resulting sulfuric acid ester of the leuco-compound of 5.5′.7.7′-tetrabromindigo can be recovered in a quantitative yield from the filtered solution, either by evaporation or by salting out with sodium or potassium chlorid.

If the 5.5′.7.7′-tetrabromindigo be replaced by 10 parts of 5.5′-dibromindigo, the sulfuric acid ester of the leuco-compound of this dyestuff is obtained in a similar manner.

Example 3

10 parts of thioindigo are reduced, in from 10 to 20 minutes, in a mixture of 70 parts of dry pyridine, 10 parts of sulfurous acid, 2 parts of a 98 per cent formic acid solution and 0.5 part of water, the operation being carried out at from 70° to 75° C., in an atmosphere of carbon dioxid. On cooling, the solution deposits ample amounts of pale yellow needles of leuco-thioindigo. If the mixture be treated, at from 10° to 12° C., with an esterifying agent prepared from 30 parts of chlorsulfonic acid and 80 parts of pyridine in the cold, and is then warmed to 35° to 40° C., for about an hour, the faintly red solution being rendered alkaline and freed from pyridine by distillation with steam, a nearly colorless solution is obtained which contains the quantitatively formed sulfuric acid ester of leuco-thioindigo.

Example 4

5 parts of indigo are reduced in about 30 minutes, at from 40° to 50° C., in a mixture of 40 parts of pyridine, 10 parts of sulfurous acid and 1.5 parts of an 85 per cent formic acid solution. The resulting indigo-white paste is treated with a mixture of 15 parts of chlorsulfonic acid, or 15 parts of chlorsulfonic-acid-methyl ester, and 50 parts of pyridine, and the mixture through which carbon dioxid is slowly passed, is stirred at from 20° to 30° C., until free leuco-compound can no longer be detected. After rendering the solution alkaline, the pyridine is distilled off with steam, and the small residual amount of indigo is removed by filtration. The solution can be concentrated and salted out, to recover the resulting sulfuric acid ester of the leuco-indigo, a good yield being obtained.

Example 5

A mixture of 5 parts of 5.5′.7.7′-tetrabromindigo, 40 parts of dimethylaniline, 100 parts of 98 per cent ethyl alcohol and 2.5 parts of an 85 per cent formic acid solution are heated, under a reflux condenser, on the water bath, sulfurous acid being passed in concurrently until reduction, recognized by the appearance of a pure yellow coloration, is complete. The alcohol is expelled from the mixture by distillation at from 30° to 40° C., under reduced pressure, and a mixture of the leuco compound of tetrabromindigo and dimethylaniline, with a faint bluish tinge, is left.

If the 40 parts of dimethylaniline be replaced by 20 parts of aniline, a mixture of the leuco compound of tetrabromindigo and aniline will be left after distilling off the alcohol.

Example 6

4.5 parts of a 98 per cent formic acid solution are dropped into a mixture of 10 parts of dimethoxydibenzanthrone, 80 parts of pyridine and 10 parts of sulfurous acid, at from 0° to 10° C., a current of dry carbon dioxid being passed therethrough. The temperature is then raised to from 25° to 30° C., whereupon reduction, with the formation of a red solution or suspension, occurs in 10 to 15 minutes. A mixture of 60 parts of pyridine and 20 parts of chlorsulfonic acid is then added at from 5° to 15° C., and the whole is heated to 30° to 35° C. for two hours, and then for a further hour to 50° C. The red mixture is poured onto ice, and after being rendered alkaline with caustic soda solution, is freed from pyridine by distillation with steam. The red sulfuric acid ester of the leuco compound of dimethoxydibenzanthrone is precipitated from the dark red filtered solution, by concentration or by saturation with potassium chlorid.

Example 7

A mixture of 26 parts of indigo, 10 parts of sodium pyrosulphite, 200 parts of formamide, 5.4 parts of an 85 per cent formic acid solution and 6 parts of ammonium formate is heated to from 80° to 90° C. in an atmosphere of coal gas, accompanied by shaking. Reduction will be complete in from 15 to 20 minutes, and the solution will deposit indigo-white on addition of water.

If the indigo be replaced by other vat dyestuffs, such for example as 5.5′-dichloranilidoquinone or thioindigo, the leuco compounds of same will be obtained.

What I claim is:

1. The process which comprises subjecting an organic compound containing a keto group to the action of sulfurous acid and formic acid in the presence of an organic base, but substantially in the absence of water.

2. The process which comprises subjecting an organic compound containing a keto group to the action of sulfurous acid and formic acid in the presence of an organic base and an inert diluent, but substantially in the absence of water.

3. The process which comprises subjecting an organic compound containing a keto group to the action of sulfurous acid and formic acid in the presence of an organic base, but substantially in the absence of water, and treating the reaction mass with an acylating agent.

4. The process which comprises subjecting vat dyestuffs to the action of sulfurous acid and formic acid in the presence of an organic base, but substantially in the absence of water.

5. The process which comprises subjecting quinone compounds to the action of sulfurous acid and formic acid in the presence of an organic base, but substantially in the absence of water.

In testimony whereof I have hereunto set my hand.

EDUARD MÜNCH.